United States Patent [19]

Erbert et al.

[11] Patent Number: 5,247,527

[45] Date of Patent: Sep. 21, 1993

[54] HIGH POWER CONTINUOUS-WAVE TITANIUM:SAPPHIRE LASER

[75] Inventors: Gaylen V. Erbert, Livermore; Isaac L. Bass, Castro Valley; Richard P. Hackel, Livermore; Sherman L. Jenkins, Livermore; Vernon K. Kanz, Livermore; Jeffrey A. Paisner, Danville, all of Calif.

[73] Assignee: The United States of America as represented by the United States Department of Energy, Washington, D.C.

[21] Appl. No.: 867,640

[22] Filed: Apr. 13, 1992

[51] Int. Cl.$^5$ .............................................. H01S 3/098
[52] U.S. Cl. ........................................ 372/19; 372/92; 372/41; 372/69; 372/93; 372/97
[58] Field of Search ................... 372/108, 107, 92, 93, 372/95, 99, 98, 18, 19, 97, 41, 69, 70

[56] References Cited

U.S. PATENT DOCUMENTS

| | | | |
|---|---|---|---|
| 5,052,017 | 9/1991 | Hobart et al. | 372/93 |
| 5,113,408 | 5/1992 | Bihler | 372/93 |
| 5,159,602 | 10/1992 | Giordano et al. | 372/21 |

OTHER PUBLICATIONS

G. Erbert et al., "High Power CW Performance from a Ti:Sapphire Laser and a Single-Pass Amplifier", published by Lawrence Livermore National Laboratory in Dec. 1990.
P. A. Schulz and S. R. Henion, "Liquid-Nitrogen-Cooled Ti:Al$_2$O$_3$ Laser", Published by Massachusetts Institute of Technology, 1990.
I. L. Bass et al., "Ti:Sapphire Laser Above 15 W CW with Line Narrowing", Presented at Tunable Solid State Lasers topical meeting, North Falmouth, Mass., May 1989.
S. R. Henion and P. A. Schulz, "Efficient, High-Average-Power, Liquid-Nitrogen-Cooled Ti:Al$_2$O$_3$ Laser", Presented at Tunable State Lasers topical meeting, North Falmouth, Mass., May 1989.

Primary Examiner—Léon Scott, Jr.
Attorney, Agent, or Firm—Miguel A. Valdes; Roger S. Gaither; William R. Moser

[57] ABSTRACT

A high-power continuous-wave laser resonator (10) is provided, wherein first, second, third, fourth, fifth and sixth mirrors (11-16) form a double-Z optical cavity. A first Ti:Sapphire rod (17) is disposed between the second and third mirrors (12,13) and at the mid-point of the length of the optical cavity, and a second Ti:Sapphire rod (18) is disposed between the fourth and fifth mirrors (14,15) at a quarter-length point in the optical cavity. Each Ti:Sapphire rod (17,18) is pumped by two counter-propagating pump beams from a pair of argon-ion lasers (21-22, 23-24). For narrow band operation, a 3-plate birefringent filter (36) and an etalon (37) are disposed in the optical cavity so that the spectral output of the laser consists of 5 adjacent cavity modes. For increased power, seventy and eighth mirrors (101, 192) are disposed between the first and second mirrors (11, 12) to form a triple-Z optical cavity. A third Ti:Sapphire rod (103) is disposed between the seventh and eighth mirrors (101, 102) at the other quarter-length point in the optical cavity, and is pumped by two counter-propagating pump beams from a third pair of argon-ion lasers (104, 105).

8 Claims, 2 Drawing Sheets

HIGH POWER CONTINUOUS-WAVE TITANIUM:SAPPHIRE LASER

The Government has rights in this invention pursuant to Contract No. W-7405-ENG-48 awarded by the Department of Energy.

This invention relates to increasing the continuous-wave power from lasing materials and particularly with respect to Titanium(Ti):Sapphire lasers.

BACKGROUND OF THE INVENTION

Ti:Sapphire has emerged as a significant new solid state laser material over the past several years. The robust nature and broad tuning range of Ti:Sapphire lends itself to many high power applications. It has been found that by cooling sapphire to liquid-nitrogen temperatures from room temperature, the thermal conductivity increases by a factor of 30 and the change in index of refraction with respect to temperature (dN/dt) decreases by a factor of 7. These effects greatly reduce the thermally induced optical distortions in Ti:Sapphire laser rods under high pump power. Recent work has shown that 1 kw Ti:Sapphire lasers in a rod geometry and cooled with liquid-nitrogen have produced 350 watts of quasi-continuous-wavelength output power under thermal steady state conditions.

SUMMARY OF THE INVENTION

It is the principal object of the invention to provide a Ti:Sapphire laser resonator which is capable of producing high continuous-wave output power in a nearly diffraction limited Gaussion output beam.

Additional objects, advantageous and novel features will be set forth in the description which follows, and in part will become apparent to those skilled in the art upon examination of the following, or may be learned by practice of the invention. The object and advantages of the invention may be realized and attained by means of instrumentalities and combinations pointed out in the appended claims.

To achieve the foregoing and other objects, and in accordance with the present invention as described and broadly claimed herein, an improved laser resonator is provided having first, second, third, fourth, fifth, and sixth mirrors forming a double-Z optical cavity, with two lasing materials of the same type disposed in the cavity with one lasing material being between the second and third mirrors and other lasing material being between the fourth and fifth mirrors, with each lasing material being pumped by two counter-propagating pump beams.

A further aspect of the invention is that one of the lasing materials is disposed at the mid-length point of the optical cavity and the other lasing material is disposed at a quarter-length point of the optical cavity.

Yet another aspect of the invention is that a triple-Z optical cavity is provided, with three lasing materials in the optical cavity and at the mid- and quarter-points along the length of the cavity and with each of the lasing materials being pumped by two counter-propagating pump beams.

BRIEF DESCRIPTION OF THE DRAWINGS

The accompanying drawings, which are incorporated in and form part of the application, together with the description serve to explain the principles of the invention.

DESCRIPTION OF THE PREFERRED EMBODIMENTS

Figure 1:
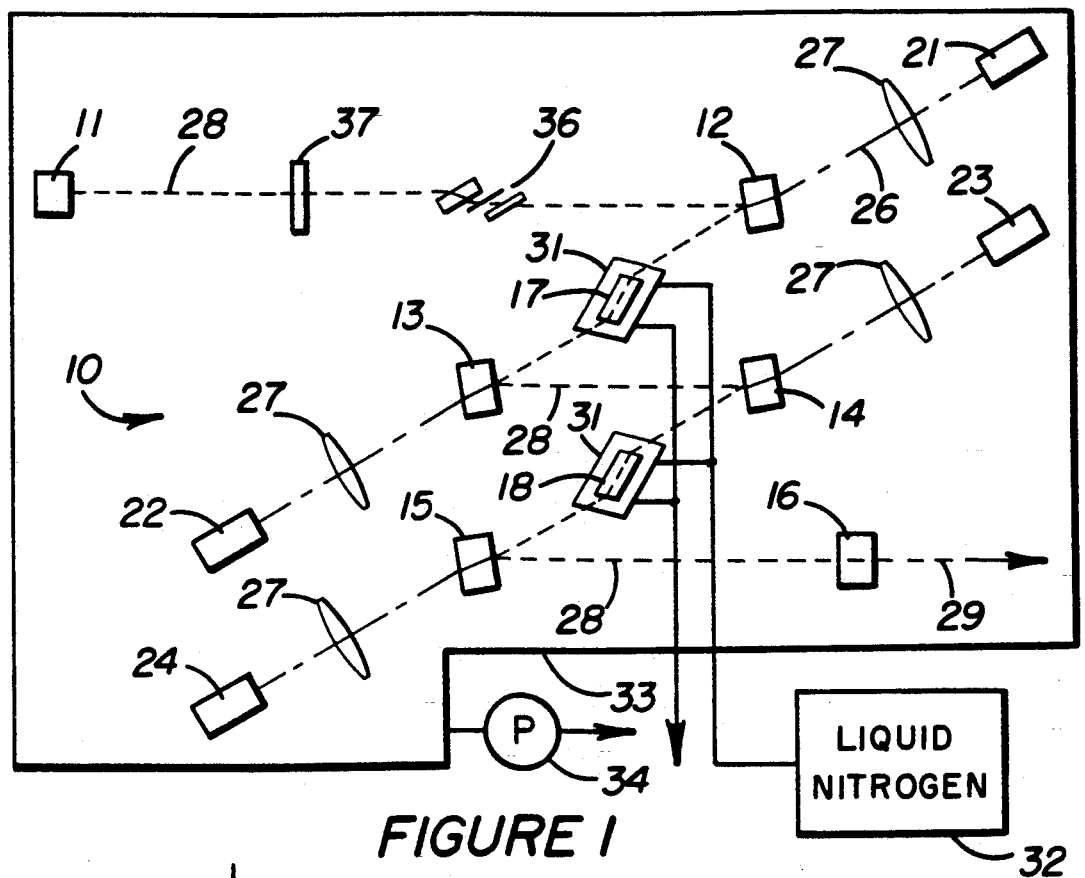
FIG. 1 is an optical schematic of the present invention utilizing a double-Z optical cavity.

Referring now to the drawings, and in particular to FIG. 1, the laser resonator 10 includes six mirrors, 11, 12, 13, 13, 15 and 16, forming a double-Z optical cavity with a predetermined length between mirrors 11 and 16, With a first Ti:Sapphire rod 17 disposed in the optical cavity between mirrors 12 and 13, and a second Ti:Sapphire rod 18 disposed in the optical cavity between mirrors 14 and 15.

The first Ti:Sapphire rod 17 is longitudinally pumped by a first pair of argon-ion lasers 21 and 22, while the second Ti:Sapphire rod 18 is longitudinally pumped by a second pair of argon-ion lasers 23 and 24.

Mirror 11 is a flat high reflector that is substantially totally reflective to a beam of the wavelength of the stimulated emission of the Ti:Sapphire rods while the output mirror is approximately 65% reflective and 35% transmissive of such stimulated emission Mirrors 12, 13, 14 and 15 are curved fold mirrors with dichroic coatings that are substantially totally reflective of the stimulated emission of the Ti:Sapphire rods but transmissive of beams of the wavelength of the argon-ion lasers 21–24.

The pump beams from the argon-ion lasers 21 and 22, indicated by the dot-dash lines 26 are focused by lenses 27 to pass through the mirrors 12 and 13 and into opposite ends of the Ti:Sapphire rod 17. In this configuration, rod 17 is pumped by two counter-propagating pump beams, and a portion of the pump beam transmitted through the rod in each direction will be reflected off of the output coupler of the opposing argon-ion laser and will then be reinjected into the rod 17. The portion of the pump beam transmitted through the output coupler of the opposing argon-ion laser will be amplified by that laser and will also be reinjected into the rod 17.

The second Ti:Sapphire rod 18 is similarly pumped by the counter-propagating and reinjecting beams from the argon-ion lasers 23 and 24. The reinjected pump light from both pairs of argon-ion lasers can improve the overall efficiency of the laser 10 by over 20%.

The stimulated emission of the Ti:Sapphire rods 17 and 18 is indicated by the dotted lines 28, with resonance occurring between mirrors 11 and 16, and with a portion of the emission exiting the output coupling mirror 16 as the continuous-wave output beam 29 of laser 10.

The two laser rods 17 and 18 are each held by conventional mounting blocks 31 for cooling from a liquid nitrogen source 32.

The entire laser 10 is preferably enclosed in a vacuum vessel 33 which is maintained at very low pressure by pump 34. The vacuum enclosure prevents condensation on the surfaces of the rods 17 and 18 and also provides a clean stable environment for the laser. External control of the various mirrors and lenses is provided by conventional mounts and motors (not shown) for these elements so that the laser can be aligned and the performance optimized at liquid-nitrogen temperatures.

For linewidth narrowing purposes, a birefringent filter 36 and etalon 37 may be inserted into the optical cavity.

In operation as a broad band laser, i.e., without the filter 36 and etalon 37, and with the use of a 35% transmission output coupler 16, the laser resonator 10 operated with a threshold of 6 watts and a slope efficiency of 44%. With a total pump power of 103 watts from the 4 argon-ion pump lasers, the laser 10 produced 43 watts of continuous wave output power. The output beam was in a first order $TEM_{oo}$ transverse mode. By measuring the size of the output beam at a focus, it is estimated to be 1.1 times diffraction limited ($M^2$ value). The output power remained linear with input power and showed no indication of degradation up to the maximum available pump power of 103 watts from the four argon-ion lasers that were used.

The stimulated emission from the laser rods 17 and 18 is a standing wave in the optical cavity and the lasing materials, i.e., the Ti:Sapphire rods, and such standing wave will have periodic points of high and low intensity along its length. The pump beams move continuously through the rods so that they energize the whole of the rods, i.e., where the intensity of the primary standing wave is high and where it is low. The lasing materials will also try to lase at those areas in the materials of low intensity of the primary standing wave, and will lase at a different wavelength, but still one in which twice the cavity length equals an integral number of the wavelengths. Depending on placement of the lasing materials in the cavity, sometimes the material will also lase at a wavelength that is ± the next longitudinal cavity mode from the primary mode. Sometimes it will also lase at ±2 cavity modes away. Sometimes the additional lasing will occur at wavelengths many cavity modes away from the primary lasing wavelength of the material. For broadband operation, the output beam can include the primary wavelength plus longitudinal modes that are many cavity modes away.

Figure 2:
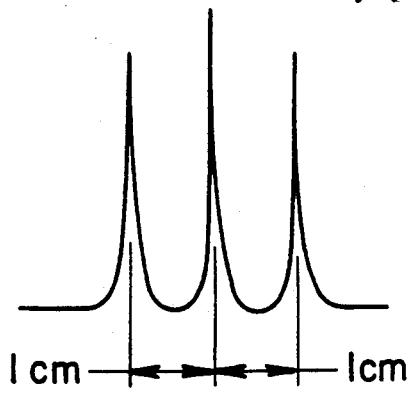
FIG. 2 illustrates the spectral output of one of the lasing materials of FIG. 1, with linewidth narrowing.
Figure 3:
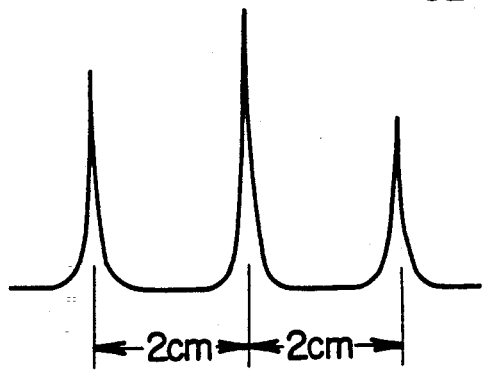
FIG. 3 illustrates the spectral output of the other lasing material of FIG. 1, with linewidth narrowing.

For narrow band operation it is desirable to operate with a small number of adjacent cavity modes fitting within the gain bandwidth and with a much output power as possible. In the present invention it has been found that with the Ti:Sapphire rod 17 at the mid-point of the optical cavity, it will operate as shown in FIG. 2 with two longitudinal modes that are each one cavity modes (CM) from the primary resonant mode of the rod. With the other Ti:Sapphire rod 18 at a quarter point along the length of the optical cavity, it will lase at two longitudinal modes each 2 cavity modes away from the primary resonant mode, as shown in FIG. 3.

Figure 4:
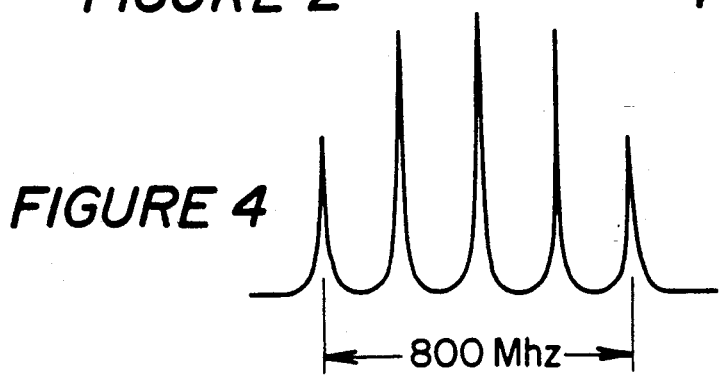
FIG. 4 illustrates the combined spectral output of the two lasing materials of FIG. 1, with linewidth narrowing.

FIG. 4 shows the output of laser 10 when a 3 plate birefringent filter 36 and a 5 mm thick etalon have been inserted into the optical cavity for linewidth narrowing. The spectral output of laser 10 consists of 5 adjacent cavity modes, each separated by the 200 Mhz free spectral range of the laser. The absence of any other modes indicates that the laser operates in a single transverse mode. With the same 35% output coupler 16 as above, a threshold of 8 watts and a slope efficiency of 40% was obtained. With 97 watts of total pump power the output of the line-narrowed laser was 36 watts.

Figure 5:
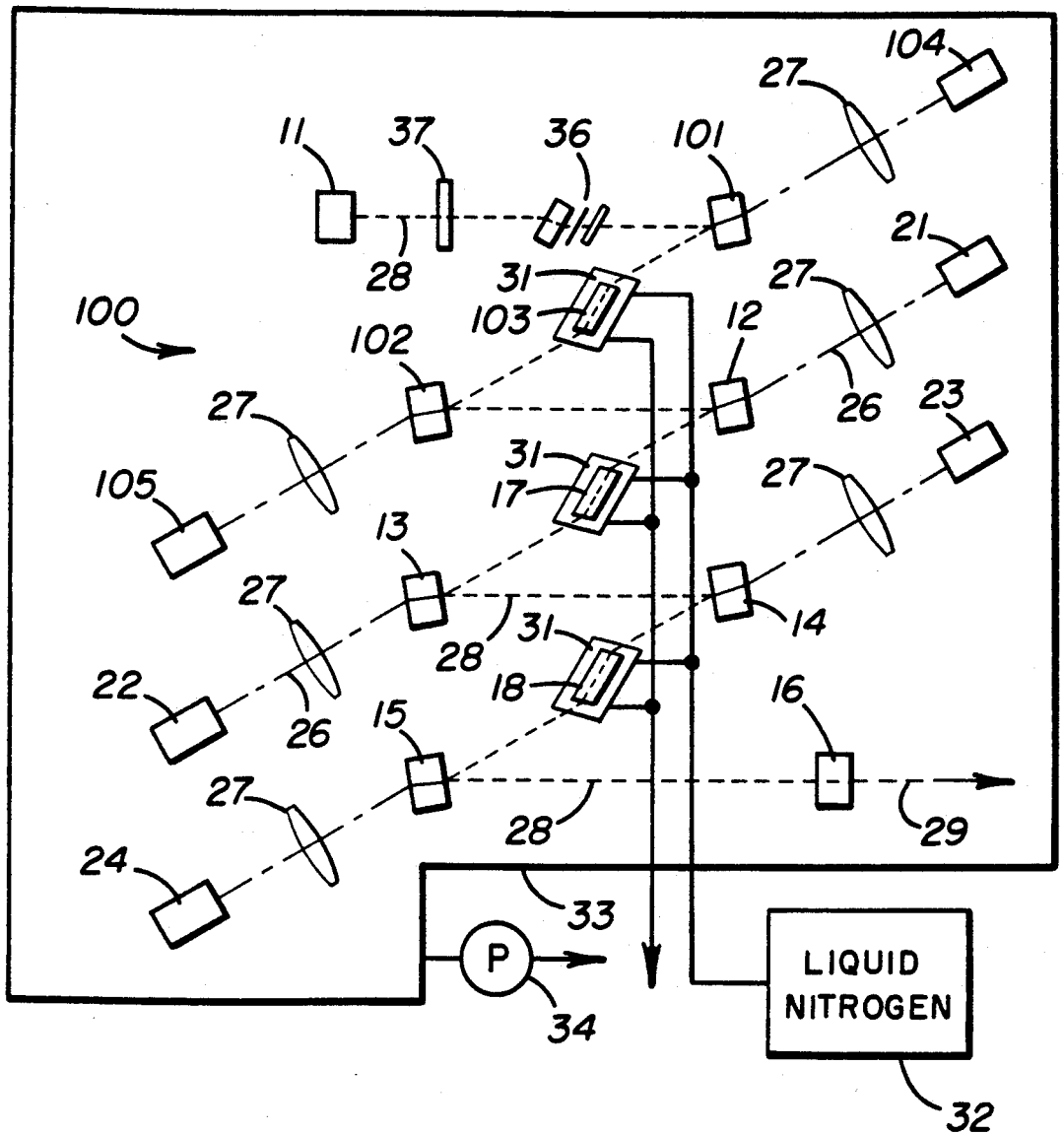
FIG. 5 is an optical schematic of the present invention, utilizing a triple-Z optical cavity.

FIG. 5 shows another embodiment of the invention. In this instance, the laser resonator 100 includes mirrors 101; and 102 disposed between mirrors 11 and 12 to form a triple-Z optical cavity with a predetermined length between mirrors 11 and 16. A third, liquid-nitrogen cooled, Ti:Sapphire rod 103 is disposed in the optical cavity between mirrors 101 and 102. As with mirrors 12-15, mirrors 101 and 102 are curved fold mirrors with dichroic coatings.

The third Ti:Sapphire rod 103 is longitudinally pumped by a third pair of argon-ion lasers 104 and 105, in a manner as described above in connection with the pumping of rods 17 and 18.

The Ti:Sapphire rod 17 is again located at the midpoint of the optical cavity, and will operate with a spectral output as shown in FIG. 2. Ti:Sapphire rods 18 and 103 are each located at quarter points along the length of the triple-Z optical cavity and each will lase at the longitudinal modes shown in FIG. 3.

When the laser resonator 100 operates with the birefringent filter 36 and etalon 37, the spectral output will also be as shown in FIG. 4.

In the system of FIG. 5, the third pair of argon-ion lasers 104 and 105 will increase the total pump power to one and a half times that of the system of FIG. 1. The continuous-wave output will also increase by a corresponding amount.

The foregoing description of the preferred embodiments has been presented for purposes of illustration and description. It is not intended to be exhaustive or to limit the invention to the precise forms described, and obviously many other modifications are possible in light of the above teaching. The embodiments were chosen in order to explain most clearly the principles of the invention and its practical applications thereby to enable others in the art to utilize most effectively the invention in various other embodiments and with various other modifications as may be suited to the particular use contemplated. It is intended that the scope of the invention be defined by the claims appended thereto.

We claim:

1. A laser resonator comprising:

first, second, third, fourth, fifth and sixth mirrors arranged in sequence to form a double-Z optical cavity having a predetermined length between said first and sixth mirrors, said first through fifth mirrors being substantially totally reflective to a beam of a first wavelength, and said sixth mirror being partially reflective to and partially transmissive of a beam of said first wavelength, a first lasing material disposed in said optical cavity between said second and third mirrors and at the mid-point along the length of said optical cavity, a second lasing material disposed in said optical cavity between said fourth and fifth mirrors and at a quarter-point along the length of said optical cavity, said first and second lasing materials being operable when pumped to produce a stimulated emission at said first wavelength, a first pair of pump means for respectively producing and sending oppositely directed pump beams of a wavelength other than that of said first wavelength to and through said first lasing material, a second pair of pump means for respectively producing and sending oppositely directed pump beams of a wavelength other than that of said first wavelength to and through said second lasing material, and means disposed in said optical cavity for narrowing the oscillation bandwidth of said optical cavity to approximately five adjacent longitudinal cavity modes.

2. A laser resonator as set forth in claim 1, wherein said second, third, fourth and fifth mirrors are transmissive to the wavelengths of said pump beams, wherein said pump beams produced by said first pair of pump means pass through said second and third mirrors, and wherein said pump beams produced by said second pair of pump means pass through said fourth and fifth mirrors.

3. A laser resonator as set forth in claim 1, and further including:
   seventh and eighth mirrors arranged between said first and second mirrors to form a triple-Z optical cavity having a predetermined length between said first and sixth mirrors, said seventh and eighth being substantially totally reflective to a beam of said first wavelength,
   a third lasing material disposed in said optical cavity between said sixth and seventh mirrors and at the other quarter-point along the length of said optical path, said third lasing material being operable when pumped to produce a stimulated emission at said first wavelength,
   a third pair of pump means for respectively producing and sending oppositely directed pump beams of a wavelength other than that of said first wavelength to and through said third lasing material.

4. A laser resonator set forth in claim 1, wherein said first and second lasing materials are both titanium:sapphire rods.

5. A laser resonator as set forth in claim 4, wherein said first and second pairs of pump means each include argon-ion lasers for producing said pump beams.

6. A laser resonator as set forth in claim 4, wherein said second, third, fourth and fifth mirrors are transmissive to the wavelengths of said pump beams, wherein said pump beams produced by said first pair of pump means pass through said second and third mirrors, and wherein said pump beams produced by said second pair of pump means pass through said fourth and fifth mirrors.

7. A laser resonator as set forth in claim 1, and further including:
   seventh and eighth mirrors arranged between said first and second mirrors to form a triple-Z optical cavity having a predetermined length between said first and sixth mirrors, said seventh and eighth being substantially totally reflective to a beam of said first wavelength,
   a third lasing material disposed in said optical cavity between said seventh and eighth mirrors and at the other quarter-point along the length of said optical cavity, said third lasing material being operable when pumped to produce a stimulated emission at said first wavelength,
   a third pair of pump means for respectively producing and sending oppositely directed pump beams of a wavelength other than that of said first wavelength to and through said third lasing material
   and wherein said first, second and third lasing materials are all titanium:sapphire rods.

8. A laser resonator as set forth in claim 7, wherein said first, second and third pairs of pump means each include argon-ion lasers for producing said pump beams, wherein said second, third, fourth, fifth, seventh and eighth mirrors are transmissive to the wavelengths of said pump beams, wherein said pump beams produced by said first pair of pump means pass through said second and third mirrors, wherein said pump beams produced by said second pair of pump means pass through said fourth and fifth mirrors and, wherein said pump beans produced by said third pair of pump means pass through said seventh and eighth mirrors.

* * * * *